(12) United States Patent
Lane et al.

(10) Patent No.: US 9,880,041 B2
(45) Date of Patent: Jan. 30, 2018

(54) HIGH-SPEED VOLUME MEASUREMENT SYSTEM

(71) Applicants: Michael H. Lane, Clifton Park, NY (US); James L. Doyle, Jr., Renton, WA (US); Michael J. Brinkman, Bellevue, WA (US)

(72) Inventors: Michael H. Lane, Clifton Park, NY (US); James L. Doyle, Jr., Renton, WA (US); Michael J. Brinkman, Bellevue, WA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/671,775

(22) Filed: Aug. 8, 2017

(65) Prior Publication Data

US 2017/0356781 A1     Dec. 14, 2017

Related U.S. Application Data

(60) Division of application No. 14/930,859, filed on Nov. 3, 2015, which is a continuation of application No. 14/088,567, filed on Nov. 25, 2013, now Pat. No. 9,194,691.

(51) Int. Cl.
| | |
|---|---|
| *G01B 11/04* | (2006.01) |
| *G01B 17/00* | (2006.01) |
| *G01F 17/00* | (2006.01) |
| *G01B 11/245* | (2006.01) |
| *G01B 11/24* | (2006.01) |

(52) U.S. Cl.
CPC .............. *G01F 17/00* (2013.01); *G01B 11/04* (2013.01); *G01B 11/24* (2013.01); *G01B 11/245* (2013.01)

(58) Field of Classification Search
None
See application file for complete search history.

(56) References Cited

U.S. PATENT DOCUMENTS

| | | | | | |
|---|---|---|---|---|---|
| 3,870,890 | A | * | 3/1975 | Binks ................... | G01B 11/105 250/559.15 |
| 3,941,484 | A | * | 3/1976 | Dreyfus ............... | G01B 11/022 250/559.2 |

(Continued)

*Primary Examiner* — Shawn Decenzo
*Assistant Examiner* — Jarreas C Underwood
(74) *Attorney, Agent, or Firm* — Jennifer R. Mahalingappa; Robert T. Burns; Brian J. Lally

(57) ABSTRACT

Disclosed is a volume sensor having a first axis, a second axis, and a third axis, each axis including a laser source configured to emit a beam; a parallel beam generating assembly configured to receive the beam and split the beam into a first parallel beam and a second parallel beam, a beam-collimating assembly configured to receive the first parallel beam and the second parallel beam and output a first beam sheet and a second beam sheet, the first beam sheet and the second beam sheet being configured to traverse the object aperture; a first collecting lens and a second collecting lens; and a first photodetector and a second photodetector, the first photodetector and the second photodetector configured to output an electrical signal proportional to the object; wherein the first axis, the second axis, and the third axis are arranged at an angular offset with respect to each other.

5 Claims, 10 Drawing Sheets

(56) References Cited

U.S. PATENT DOCUMENTS

| | | | | |
|---|---|---|---|---|
| 4,598,998 A * | 7/1986 | Kamei | ............... | G01B 11/2425 356/237.5 |
| 5,383,021 A * | 1/1995 | Hanna | ................ | G01B 11/2425 250/559.26 |
| 6,407,818 B1 * | 6/2002 | Whitehouse | ......... | A22C 17/002 250/559.21 |
| 8,390,826 B2 * | 3/2013 | Walstra | .............. | G01B 11/2433 356/625 |
| 8,570,504 B2 * | 10/2013 | Nygaard | ................ | B07C 5/342 356/237.1 |

* cited by examiner

Figure 1
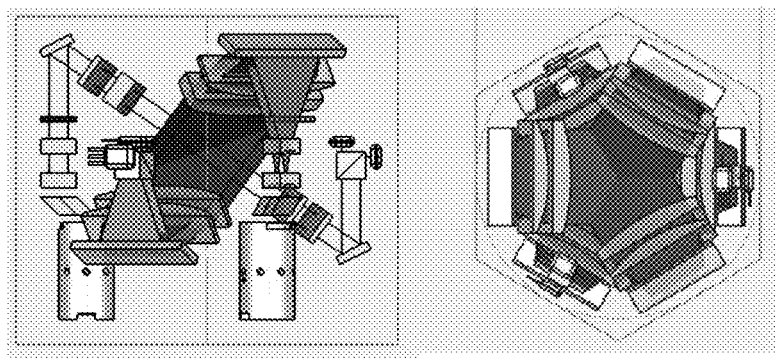
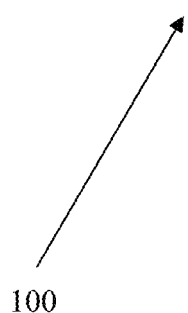
100

Figure 4A: Detector Signal Response
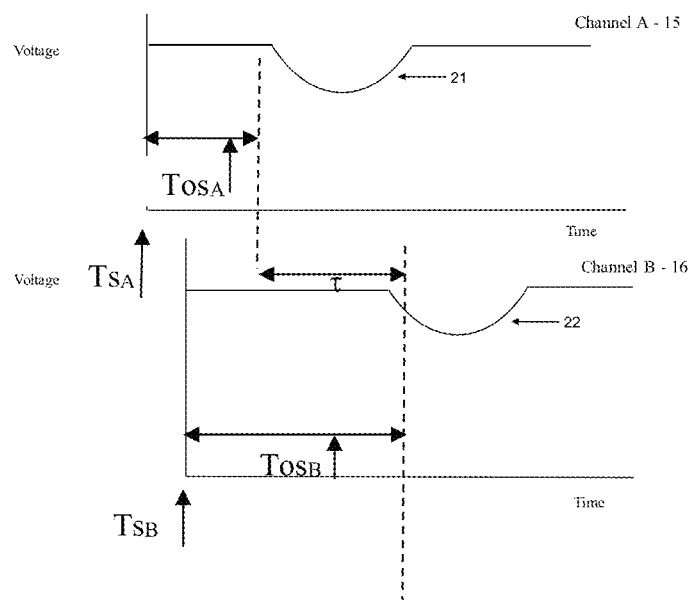
Figure 4B: Calibrated Profile
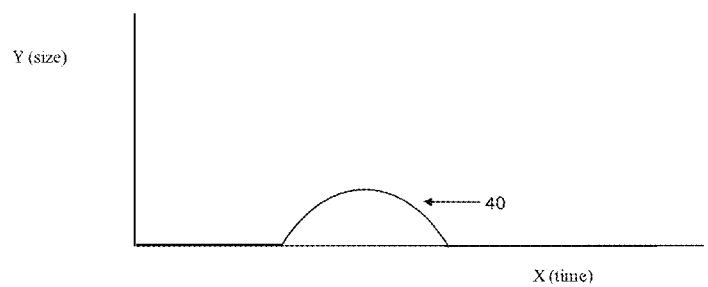

Figure 5: Beam Cross Section
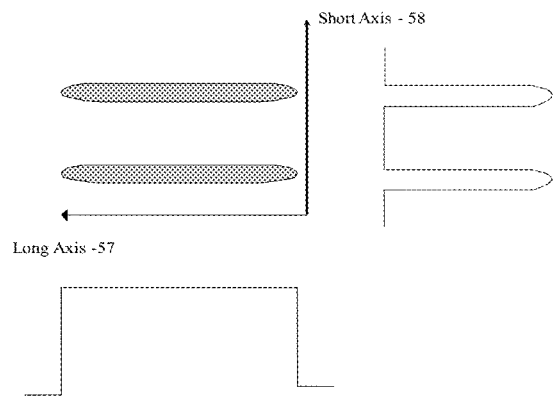
Figure 6: Beam Apodization
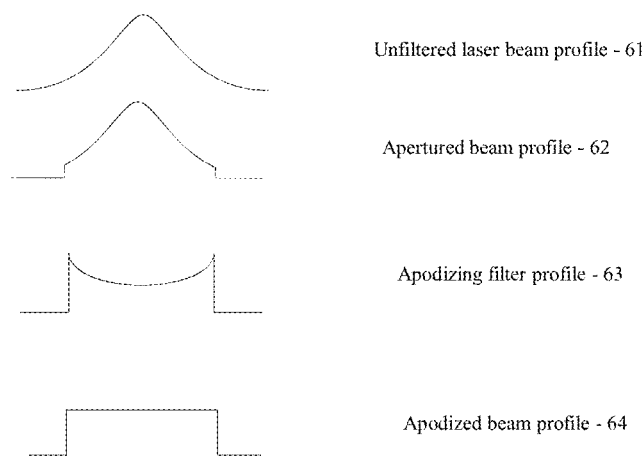

Figure 7: Rhomboid Prism – Exploded View
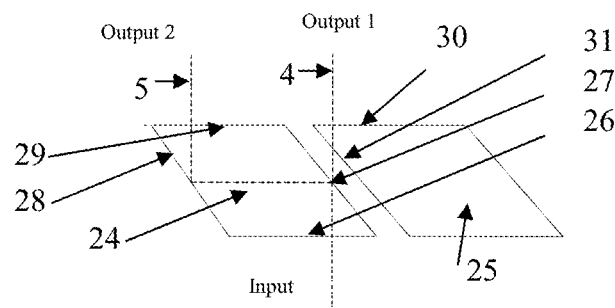
Figure 8: Rhomboid Prism – Alternate Design
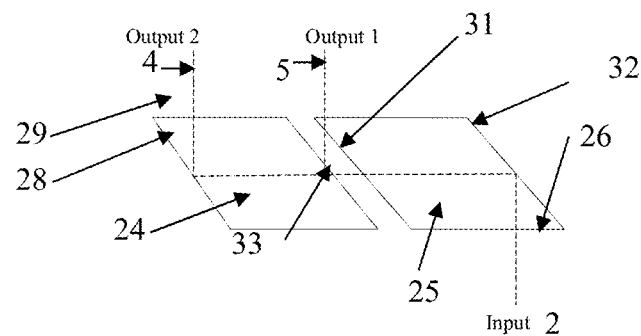

Figure 9: System Block Diagram
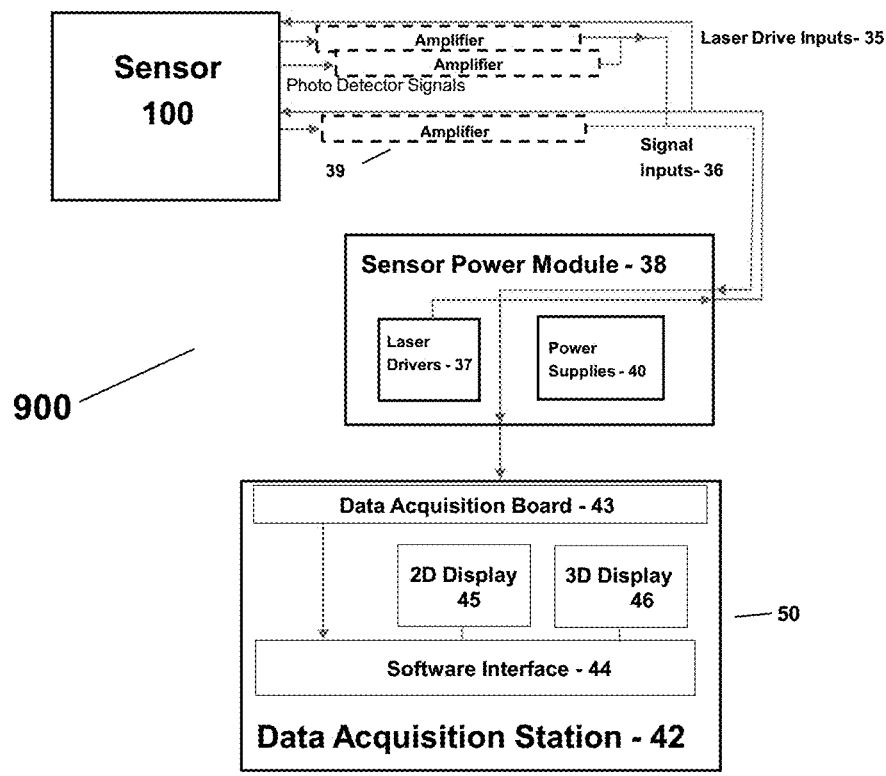

Figure 10: Real-Time Data Processing
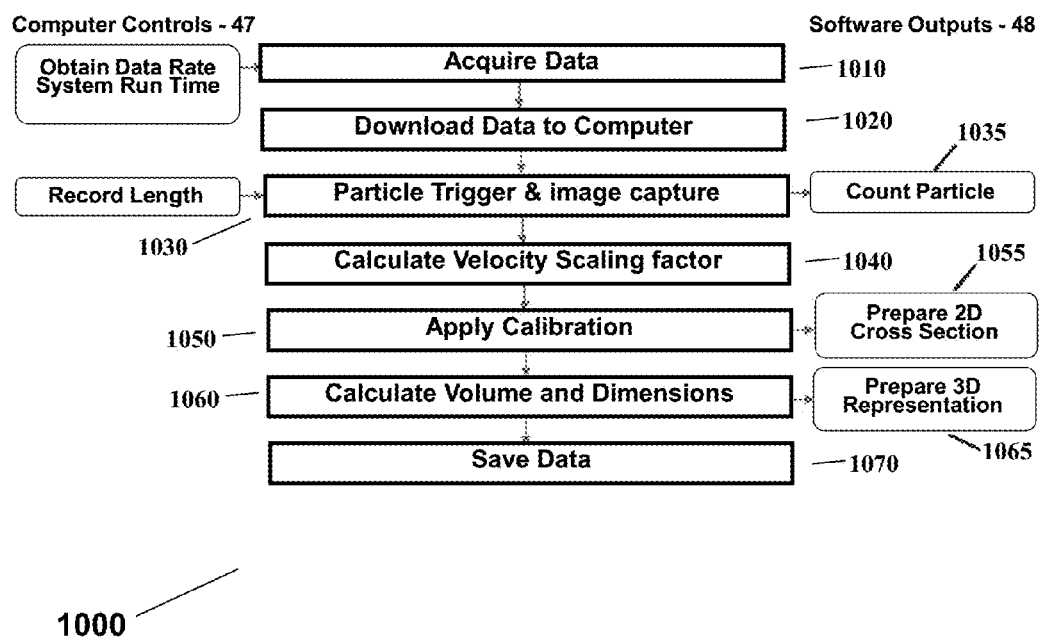

D and A are calibration parameters
X and Z are calibrated particle dimensions

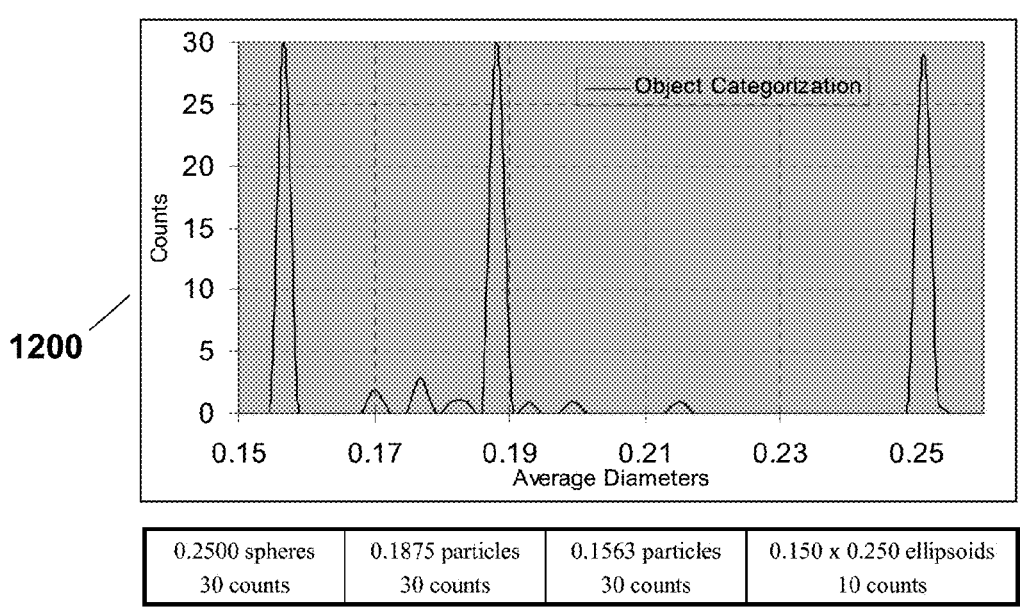
Figure 12: Object Categorization
Precision Ball Bearings and Ellipsoids – 100 Samples
*0.2500, 0.1875 and 0.1563 inch Diameters*

HIGH-SPEED VOLUME MEASUREMENT SYSTEM

CLAIM TO PRIORITY

This application is a Divisional Application of U.S. Utility application Ser. No. 14/930,859 filed on Nov. 3, 2015, which is a Continuation Application of U.S. Utility application Ser. No. 14/088,567 filed on Nov. 25, 2013, now U.S. Pat. No. 9,194,691. This application claims priority to both references, both of which are hereby incorporated by reference in their entirety.

NOTICE OF GOVERNMENT RIGHTS

The United States Government has rights in this application and any resultant patents claiming priority to this application pursuant to contract DE-AC12-00SN39357 between the United States Department of Energy and Bechtel Marine Propulsion Corporation Knolls Atomic Power Laboratory.

TECHNOLOGICAL FIELD

This present subject matter relates to systems and methods of high-speed volume measurement.

BACKGROUND

Existing object sizing technologies include dynamic light scattering, laser light diffraction, mechanical sieves, video imaging, image analysis, and scanning light beam projection. The technologies are limited to analyzing groups of objects, without providing detailed information on dimensions or imperfections of individual objects, and have other limitations as well. These technologies are limited to creating two-dimensional object signatures or object cross sections, with no ability to do three-dimensional (3D) sizing analysis. Many times, the measured object is stationary with the beam scanning the object multiple times in order to obtain a size measurement. Some of these measuring techniques, for example, use only a single light sheet or beam. A single light sheet or beam apparatus allows for only a single variable, however, which is insufficient for calculating velocity. Such an apparatus can detect the presence of an object when the light is shadowed, but has no way of calculating the object size without knowing the object velocity. Thus a single light sheet or beam is unable to determine object velocity, requiring that object velocity be known in advance or input into the measurement device. This is problematic, as object velocity often varies or is unknown, such as with freely falling objects.

For analyzing large numbers of objects or a steady feed, video imaging and image analysis technologies are employed, but are speed-limited because of limitations on processing power available to perform the associated computer computations. Another object measurement methodology uses scanning light beam projection. Scanning light beam projection is used on single objects in a process line and requires the object to be moving at a known or predetermined velocity. Scanning light beam projection also typically uses rotating mirrors, potentially leading to inaccuracies.

There are several apparatuses embodying one or more of these techniques. One such apparatus is disclosed in U.S. Pat. No. 4,659,937. This patent is described as a laser beam focused on a single axis using a combination of cylindrical lenses and a laser-detector pair used to detect defects and measure wire diameter. Another reference (U.S. Pat. No. 6,927,409) is described as disclosing the monitoring of the drawing of wire or metal bar stock using rotary optical sensors to determine a product type and to detect product defects. The rotary sensors measure the part in two dimensions using polar coordinates. The sensor output is compared to known product standards to determine the presence and type of product and to detect any defects.

Yet another reference (U.S. Pat. No. 4,917,494) is described as disclosing a time-of-flight optical system that uses two closely spaced and substantially parallel light beams for measuring particle sizes by recording the time-of-flight between the two beams. Each light beam has a thin elongated cross-sectional shape and the particles are passed through the apparatus in a vacuum stream. Another reference (U.S. Pat. No. 5,164,995) is described as disclosing an apparatus for measuring parts on a process line. The parts typically move on a planar track between an optical emitter and a detector pair, with compensations for voltage variations due to any variation in vertical motion.

Other examples are disclosed in three references (U.S. Pat. Nos. 5,383,021; 5,568,263; and 6,285,034), described as disclosing a non-contact multi-sensor bolt-sizing apparatus in which bolts move along a track, partially blocking laser beams to create shadows on corresponding detectors. The disclosed apparatuses are described as using sheets of laser light, both parallel and perpendicular, to produce two-dimensional part images. These apparatuses are unable to detect a part's velocity, however, unless the part size is known in advance or obtained from evaluating part profile information. Additionally, the parts must also be directed in a desired orientation on a track in order to be measured. None of these references disclose a way to measure parts in three dimensions moving at an unknown velocity. They are limited to two-dimensional object signatures or two-dimensional object cross sections.

SUMMARY

Disclosed is a system and apparatus of non-contact volume measurement. In certain exemplary embodiments, the sensor includes first, second, and third laser sources configured to emit first, second, and third laser beams; first, second, and third beam splitters configured to split the first, second, and third laser beams into first, second, and third beam pairs; first, second, and third optical assemblies configured to expand the first, second, and third beam pairs into first, second, and third pairs of parallel beam sheets; fourth, fifth, and sixth optical assemblies configured to focus the first, second, and third parallel beam sheet pairs into fourth, fifth, and sixth beam pairs; and first, second, and third detector pairs configured to receive the fourth, fifth, and sixth beam pairs and convert a change in intensity of at least one of the fourth, fifth, and sixth beam pairs resulting from an object passing through at least one of the first, second, and third parallel beam sheets into at least one electrical signal proportional to a three-dimensional representation of the object.

An exemplary method of non-contact volume measurement includes the steps of emitting first, second, and third laser beams; splitting the first, second, and third laser beams into first, second, and third beam pairs; expanding the first, second, and third beam pairs into first, second, and third pairs of parallel beam sheets; focusing the first, second, and third parallel beam sheets into fourth, fifth, and sixth beam pairs; and receiving the fourth, fifth, and sixth beam pairs and converting a change in intensity of at least one of the fourth, fifth, and sixth beam pairs resulting from an object passing through at least one of the first, second, and third parallel beam sheets into at least one electrical signal proportional to a three-dimensional representation of the object.

Certain exemplary methods further include the steps of further comprising the step of forming a three-dimensional representation of the object by converting a plurality of fourth, fifth, and sixth laser beam electrical signal data proportional to a cross section of the object into a spherical coordinate system and interpolating spherical radii between the plurality of converted cross-sectional electrical signal data. Still other exemplary methods include the step of integrating at least three cross sections together to form a three-dimensional representation of the object. In certain methods, up to 10,000 three-dimensional representations are formed per second. Still other exemplary methods include the step of calculating a velocity of the object based on a distance between two parallel beam sheets and a time delay between when the object passes between a first of the two parallel beam sheets and when the object passes through a second of the two parallel beam sheets.

Yet another exemplary method includes the steps of acquiring data on a plurality of light intensities received from three mutually orthogonal light sources; identifying a change in intensity in at least one of the plurality of received light sources; determining a presence of an object when the change in light intensity exceeds a predetermined magnitude in a predetermined number of received light sources; acquiring cross-sectional data points on the detected object; and determining an end of a presence of an object when the change in light intensity falls below the predetermined magnitude in the predetermined number of received light sources. Certain exemplary methods further include the steps of recording a time that the presence of the object is detected; and recording a time that the presence of the object is no longer detected.

Still another exemplary embodiment includes a computer program product including a non-transitory computer readable medium having stored thereon computer executable instructions that when executed causes the computer to perform a method of non-contact volume measurement, the method including the steps of receiving data on light intensity of at least one of a first, second, and third laser beams; detecting a change in light intensity in at least one of the first, second, and third laser beams resulting from an object passing through at least one of a first, second, and third parallel beam sheet pairs; and converting the data on the change in light intensity of at least one of the first, second, and third laser beams into an electrical signal proportional to a three-dimensional representation of the object.

BRIEF DESCRIPTION OF THE DRAWINGS

A description of the present subject matter including various embodiments thereof is presented with reference to the accompanying drawings, the description not meaning to be considered limiting in any matter, wherein:

FIG. 1 illustrates an exemplary three-axis sensor;
FIG. 4A illustrates an exemplary detector signal response;
FIG. 4B illustrates an exemplary calibrated profile;
FIG. 5 illustrates an exemplary beam cross section;
FIG. 6 illustrates an exemplary beam apodization;
FIG. 7 illustrates an exemplary rhomboid prism;
FIG. 8 illustrates an exemplary alternate rhomboid prism;
FIG. 9 illustrates an exemplary sensor system block diagram;
FIG. 10 illustrates an exemplary embodiment of real-time data processing;
FIG. 12 illustrates a histogram of an exemplary object categorization.

Similar reference numerals and designators in the various figures refer to like elements.

DETAILED DESCRIPTION

FIG. 1 illustrates an exemplary three-axis non-contact volume sensor 100. The sensor 100 is capable of measuring and/or calculating object volumes at rates of up to approximately 10,000 objects per second. The exemplary embodiment of FIG. 1 is a three-axis sensor, but additional axes can be used without departing from the scope of the present subject matter.

Figure 2:
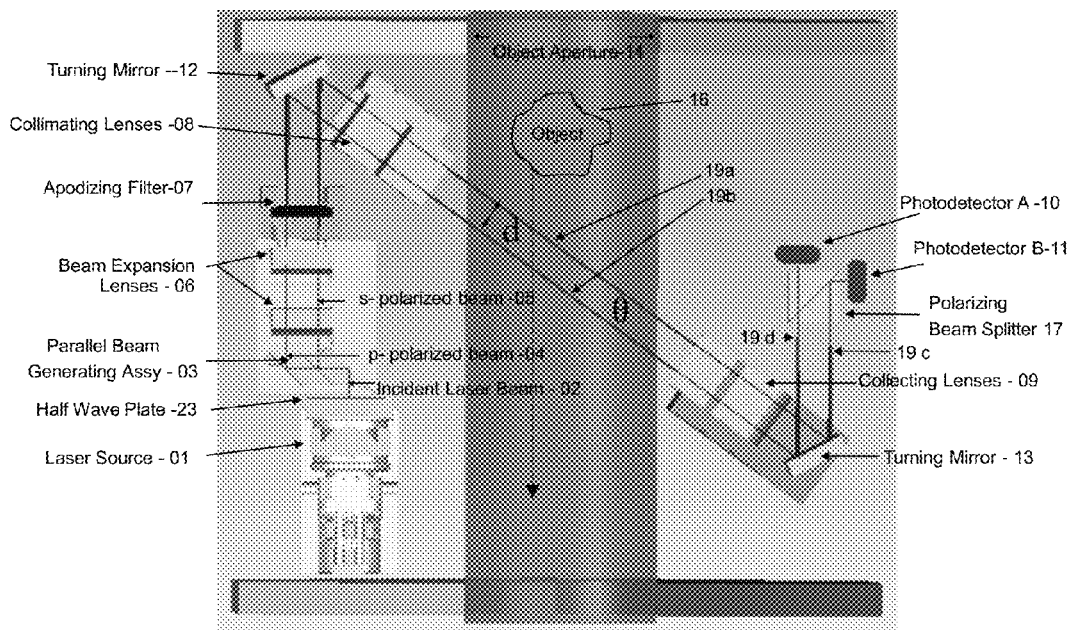
FIG. 2 illustrates a single channel of an exemplary sensor.

FIG. 2 discloses an exemplary embodiment of a single channel module of a non-contact volume sensor 100. In the exemplary embodiment shown, measurements are taken on three axes having three beam sheet pairs 19a/19b. In the exemplary embodiment of FIG. 2, the three beam sheet pairs 19a/19b form three measurement planes. Although the embodiment has three beam sheet pairs 19a/19b, only one is shown for clarity. Each beam sheet pair 19a/19b has a source 1 and a corresponding pair of detectors 10 and 11, with outputs from the detectors 10 and 11 combined to form a three-dimensional profile. In the exemplary embodiment of FIG. 2, source 1 includes a laser diode and focusing lens. Other lasers, such as HeNe lasers, solid state lasers, or other beam sources known to those of skill in the art may also be used without departing from the scope of the present subject matter. The beam wavelength in this exemplary example is in the red light range, 600-670 nm, but other wavelengths may be used without departing from the scope of the present subject matter. A violet or ultraviolet laser diode with a wavelength below 410 nm, for example, may be used if a smaller beam footprint (diameter) or higher measuring resolution is desired. Emitters of still other wavelengths may be used without departing from the scope of the present subject matter.

Measurements can be taken simultaneously on each axis, but need not be, as the object may pass through the parallel beam sheet pairs at different times depending on the location of the measured object. In the exemplary embodiment of FIG. 2, each beam sheet pair 19a/19b is independent of other beam sheet pairs 19a/19b. The use of three axes is exemplary only, as additional axes may be used without departing from the scope of the present subject matter. In the embodiment shown in FIG. 1, the sensor axes are arranged at rotational angle of 120 degrees to each other, at an elevation angle of about 35 degrees from the horizontal plane. These angular offsets and elevations are exemplary only. Other values can be used without departing from the scope of the present subject matter.

In this exemplary embodiment, an object 16 passes through laser light sheets 19a/19b, with the object 16 creating shadows in the light sheets 19a/19b. These shadows are focused onto detectors 10 and 11, which produce one or more electrical signals proportional to a cross section of the object 16 as it passes through the light sheets 19a/19b. In the exemplary embodiment of FIG. 2, source 1 emits beam 2, which is split by a beam-generator assembly 3 into a first and second parallel beams 4 and 5. The beam splitter shown polarizes the first and second parallel beams 4 and 5 in the embodiment shown, but need not in other exemplary embodiments. The beams 4 and 5 pass through beam expansion lenses 6, an apodizing filter/optical aperture 7, and beam-collimating lenses 8. Lens generically refers to any optical assembly used by those of skill in the art to focus or redirect light. Parallelism is defined by the equation $$\theta = 1/2 * \sin^{-1}(2*\epsilon/W)$$

where $\theta$ is the angle that two beams or beam sheets point toward each other, $\epsilon$ is the desired axial measurement accuracy, and W is the object aperture of the beam 14. For an $\epsilon$ of 0.0001 inches and an object aperture size W of 0.75 inches, $\theta$ is 0.008 degrees.

In exemplary embodiments using non-cylindrically symmetric sources, the source may also contain a half wave plate 23, which when turned rotates the polarization of incident laser beam 2. The laser beam 2 passes through a beam-generator assembly 3, creating parallel beam 4, which has a p-polarization, and parallel beam 5, which has an s-polarization. The ratio in intensities between the two beams is determined by the polarization of the input beam 2, which is controlled by the half wave plate 23. Alternately, for cylindrically symmetric beams such as HeNe lasers or circularized laser diodes, the polarization of the incident laser beam may be rotated by rotating the laser source, which eliminates the need for a half wave plate.

The output of the beam-collimating lens assembly 8 is a pair of beam sheet sheets 19a and 19b spanning the path of object 16. Object 16 crosses light sheets 19a and 19b at different times, creating temporally offset shadows (not shown) on collecting lenses 9, which focus the shadowed beams 19c and 19d onto detectors 10 and 11. The detectors 10 and 11 convert changes in beam intensity resulting from these shadows into one or more electrical signals proportional to the object cross-section and/or a three-dimensional representation of the object. In certain exemplary embodiments, the light can be focused through a polarizing beam splitter 17 prior to reaching detectors 10 and 11. In certain exemplary embodiments, mirrors 12 and 13 may be used to fold the optical path to reduce the size of the measurement apparatus 100. Other optical components known to those of skill in the art can be used in place of or in addition to these components. For example, a phased emitter or a wide stripe laser or laser array could be used to produce the light sheets. Integrating spheres, apertured detectors, band-pass filters, one or more receiver arrays, or other detection methods known to those skilled in the art may be used without departing from the scope of the present subject matter.

Figure 3:
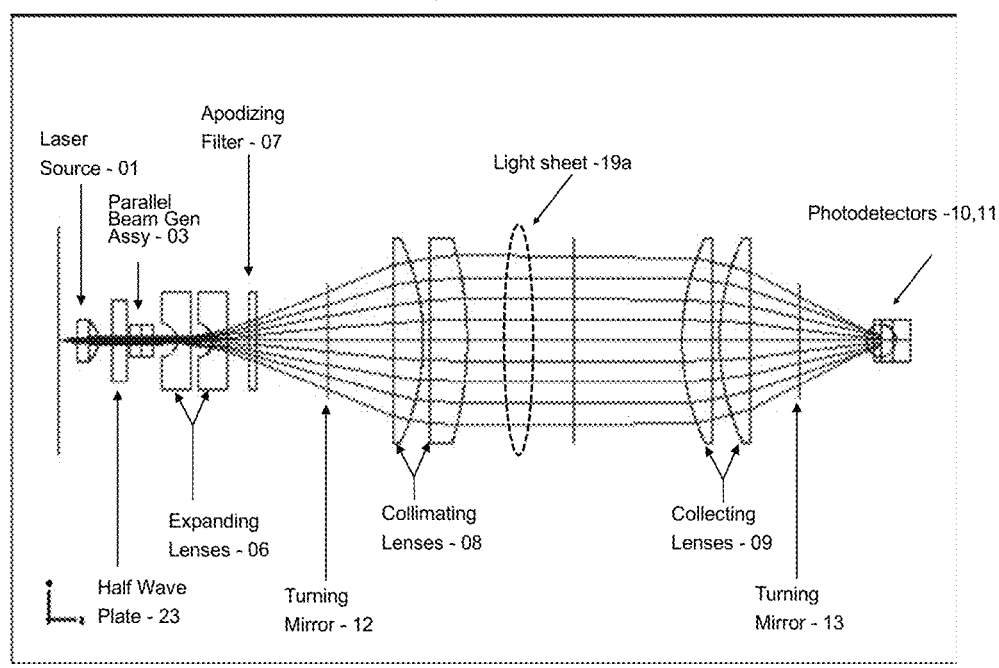
FIG. 3 illustrates an exemplary sensor optical layout.

FIG. 3 illustrates an exemplary sensor optical layout. In the exemplary layout of FIG. 3, a light sheet 19a is shown in an orthogonal view of the exemplary embodiment of FIG. 1. In the embodiment of FIG. 3, beams 4 and 5 (as shown in FIG. 2, for example) exit the beam-generator assembly 3 as converging beams. A beam-expanding lens assembly 6 causes the beams to diverge, and a beam-collimating lens assembly 8 collimates the expanded beams to form light sheets 19a and 19b (as shown in FIG. 2, for example). In the exemplary embodiment shown, sheets 19a and 19b are configured such that the width of the sheets exceeds the diameter of an object 16 traveling through the sheets plus the uncertainty of the position of the object 16 as it travels through sheets 19a and 19b. A collecting lens assembly 9 converges and focuses sheets 19a and 19b onto detectors 10 and 11.

FIG. 4A illustrates an exemplary detector signal response. In the exemplary response of FIG. 4A, a time delay $\tau$ between the object falling between the two parallel light sheets is equal to $$\tau = (ts_A + tos_A) - (ts_B + tos_B)$$

where $ts_A$ and $ts_B$ are the start time of the of the data sections for first and second data acquisition channels respectively, and $tos_A$ and $tos_B$ are the object start times, measured from the beginning of the respective data sections.

The velocity of object 16 is calculated from the distance between light sheets 19a and 19b and a time delay between the signals on detector channels 15 and 16. As the object 16 travels through beam 19a and 19b, it causes the intensity of light received at detectors 10, and 11 to decrease, corresponding to a cross-sectional profile of object 16 as it passes through a beam sheet. The same cross section profile appears for both detector signal channels 15 and 16, but delayed in time for the second detector signal 22 compared to the first detector signal 21. As the physical spacing between beams 19a and 19b is known, the velocity of the object 16 can be calculated based on the delay between the signals on channels 15 and 16. The time delay $\tau$ is related to the velocity V of the object traveling through the object aperture 14, according to the equation $$V = d/[\tau * \sin(\theta)] - a\tau/2$$

where d is the separation between the two beams (as shown, e.g., in FIG. 2), a is the acceleration of the object as it travels through the beams, and $\theta$ is the angle of beams with respect to the direction of motion of the object.

In certain exemplary embodiments, at least a portion of this information is used to create a calibrated profile, as illustrated in the exemplary calibrated object profile 40 of FIG. 4B. The velocity of object 16, calculated by object travel time between sheets 19a and 19b, is used to calibrate the time axis to the x-axis, to create the particle cross section. Measurement accuracies better than 0.1 percent of the sheet spacing are achieved on the calibrated x-axis. Where objects are freely falling vertically without air resistance, a is the acceleration due to gravity. Since the distance is known, the data obtained is used to convert the voltage signal to an output on the y-axis as a representation of size of the object 16 passing through sheets 19a and 19b as a function of time.

FIG. 5 is an illustration of an exemplary beam cross section. In the beam shown in FIG. 5, each of the laser beams has a long axis 57 and a short axis 58. The minimum short axis 18 beam size across the aperture 14 is set by the Gaussian transmission properties of the laser beam, according to the equation $$\omega = \sqrt{[W*\lambda/(\pi*\sin(\theta))]}$$

where $\omega$ is the minimum spot size at the edges of the aperture, W is the width of the aperture 14, $\theta$ is the angle of light sheets with respect to the aperture, and $\lambda$ is the wavelength of the laser beam. The long axis 57 beam size is set to be larger than the object aperture 14, so that objects falling through the beam do not extend beyond the beam edges. The diameter of the object aperture 14 is larger than the object diameter plus any uncertainty in the object position. In certain exemplary embodiments, the long axis 57 of the beam has a flat top profile to minimize variations in the beam intensity along that axis.

FIG. 6 illustrates an exemplary beam apodization. Beam apodization is used in certain exemplary embodiments to create more uniform emitted beam profiles by reducing variations in emitted beam intensity. Variations in emitted beam intensity are undesirable, as they can result in variations in detected beam intensity that are unrelated to detection and/or measurement of object 16. In the example shown in FIG. 6, the profile of expanded laser beam 61 along the long axis 57 of FIG. 5 before the apodizing filter 7 approximates a Gaussian function, with an intensity that approaches zero at the edges of the beam. The Gaussian function is defined by the equation $I=\exp(-2*x^2/\omega^2)$, where x is the distance from the center of the laser beam, and $\omega$ is the characteristic expanded spot size on long axis 57.

As shown in FIG. 6, the Gaussian profile of beam 61 has significant intensity variations. To flatten beam 61, apodizing filter 7, which has variable transmission across long axis 57 of the beam and a constant transmission across the short axis 58 of the beam, is used. The apodizing filter 7 has an aperture (not shown) which cuts the edges beam 61 to form apertured beam 62, and an apodizing function characterized by an apodizing filter profile 63, to create apodized beam 64. The apodizing filter transmission function has a minimum in the middle, increasing to a maximum at the edge of the beam (as shown in elements 21 or 22 of FIG. 4A for example). A typical transmission function is given by the equations $$T=\exp(2*x^2/\omega^2-2*x_a^2/\omega^2) \text{ if } -x_a<x<x_a, \text{ and}$$

$$T=0 \text{ if } x>x_a \text{ or } x<-x_a$$

where $x_a$ is a constant equal to the half-width of the apertured beam. After passing through apodizing filter 7, apodized beam 64 has a profile approximating an optimal flat top profile on the long axis 57.

FIG. 7 illustrates an exemplary view of a rhomboid prism. The exemplary prism of FIG. 7 is used in an exemplary beam-generator assembly 3. The exemplary beam-generator assembly shown includes a rhomboid prism 24 and a secondary prism 25. The rhomboid prism 24 includes optical surfaces 26-29. The degree of parallelism between surfaces 27 and 28 is determined by the desired accuracy $\epsilon$ and aperture size W as previously discussed. The prism can be any optical material which transmits the beam. One non-limiting example is BK7, but other optical materials may be used without departing from the scope of the present subject matter. The secondary prism 25 may be of a variety of shapes, such as a triangle or rhomboid. To minimize the number of manufactured components, the secondary prism 25 is depicted as a rhomboid with identical dimensions to the rhomboid prism 24, but need not be. In this exemplary embodiment, rhomboid prism 24 and secondary prism 25 are attached together with optical cement and polished to achieve a uniform output surface for both the s-polarized beam 5 and p-polarized beam 4. Other attachment mechanisms and methods known to those of skill in the art may be used without departing from the scope of the present subject matter.

Several surfaces on the prisms of this exemplary embodiment optionally include optical coatings. The first reflecting surface 27 has a polarization-separating coating, which preferably has an extinction ratio (Tp/Ts) of 1,000:1 on the transmitted beams 4 and 5. The second reflecting surface 28 also has a polarization-separating coating to reflect the s-polarized beam 5 and further attenuate any residual p-polarization light in the beam and achieves an extinction ration (Rs/Rp) better than 1,000:1. These extinction ratios are exemplary only. Other extinction ratios can be used without departing from the scope of the present subject matter. The input edge 26 and output edge 29 of the rhomboid prism, and the output edge 31 of the secondary prism are anti-reflection coated with a reflection coefficient less than 0.5% to minimize interference of secondary reflected beams with the primary system beams (i.e. the beams that are to be measured). The coating discussed here is exemplary only. Other coatings known to those of skill in the art may be used without departing from the scope of the present subject matter.

FIG. 8 illustrates an exemplary of an alternate prism design. In this exemplary embodiment, the prism is used in exemplary beam-generator assembly 3. In this embodiment, input beam 2 reflects off a reflective surface 32 before impinging on polarizing surface 33 and splitting into polarized beams 4 and 5. The polarizing surface 33 has a polarizing-separating coating which reflects the s-polarized beam 5 and transmits the p-polarized beam at an extinction ratio (Rs/Rp) exceeding 1,000:1. In this exemplary embodiment, the second reflecting surface 28 needs only a reflective coating, as Ts for the polarizing surface is low enough that any light detected from the secondary beam will not interfere with measurement of the primary beam. In this embodiment, input surface 26 is on the secondary prism 25. The input surface 25 and output surfaces 29, 31 have the same anti-reflection coatings described in other embodiments above.

FIG. 9 illustrates an exemplary system block diagram of the exemplary sensor 100 of FIG. 1. In the embodiment of FIG. 9, the sensor 100 includes laser drive inputs 35 for the lasers, and signal inputs 36 for the detector pairs 10 and 11. In the embodiment shown, the laser drivers 37 are in sensor power module 38. The sensor power module 38 contains laser drivers 37, which deliver power to the lasers 1, and power supply 40 for a detector board (not shown). In certain embodiments, sensor power module 38 compensates for variations in beam intensity. At least one amplified detector signal passes through sensor power module 38. The detector pairs 10 and 11 produce electrical current signals, which are in certain embodiments optionally converted to voltage signals by amplifiers 39 (shown in dashed lines on FIG. 9). The bandwidth amplifier 39 must be large enough to resolve the smallest measured object feature, and the gain must be sufficient to deliver a measurable voltage signal.

In certain embodiments, module 38 corrects for variations in laser power by sampling at least a portion of the transmitted beams to detect any change in intensity of the transmitted beam 2. Any changes in intensity are compensated for at the detectors 10, 11 so that these changes are not incorrectly interpreted as an object passing through beam sheets 19a/19b. In still other exemplary embodiments, power module 38 includes a reference detector (not shown) that detects beam amplitude as it is transmitted, so that transmission variations are not counted as beam shadows.

The exemplary embodiment illustrated in FIG. 9 further includes a data acquisition station 42, implemented here using a computer 50 having a high-speed data acquisition board 43 with a plurality of channels, in this example two per axis. Each channel is measuring a beam pair (see, e.g., 19c/d of FIG. 2), with one beam of the beam pair measured on one channel, and the other beam of the beam pair measured on another channel. The computer 50 optionally includes at least one processor (not shown) as a hardware device for executing software stored in a non-transitory computer-readable medium. The processor can be any custom made or commercially available processor, a central processing unit (CPU), an auxiliary processor among several processors associated with computer 50, a semiconductor based microprocessor (in the form of a microchip or chip set, for example), a microcontroller, or generally any device for executing software instructions. In certain exemplary embodiments, the memory can have a distributed architecture, where various components are situated remote from one another. The processor is configured to execute software stored within the memory, to communicate data to and from the memory, and to generally control operations of the computer 50 pursuant to the software. When the systems and methods described herein are implemented in software, the methods are stored on any non-transitory computer readable medium for use by or in connection with any computer related system or method. In the context of this document, a non-transitory computer readable medium is an electronic, magnetic, optical, or other physical device or means that can contain or store a computer program for use by or in connection with a computer related system or method. The software in the non-transitory computer-readable medium may include one or more separate programs, and may be in the form of a source program, executable program (object code), script, or any other entity comprising a set of instructions to be performed.

The exemplary embodiment of FIG. 9 further includes a software interface 44 configured to provide user control of the data acquisition process, with a real-time display 45 showing object cross-sections, and post processing analysis tools providing 3D representations 46 and volume measurements. If a reference detector is used for each laser to make corrections for laser power variations, additional amplifier channels and data acquisition channels may be included. These additional components are not shown.

FIG. 10 illustrates an exemplary embodiment of real-time data processing 1000. In the embodiment shown, computer controls 47 are used to initiate data acquisition in step 1010. Computer controls 47 include but are not limited to data rate, record length, and/or trigger threshold. In this embodiment, data is fed by data channels into an acquisition memory (not shown). The software periodically transfers blocks of data from the acquisition memory to computer (not shown) in step 1020. The computer 50 analyzes the data, looking for signal changes corresponding to a detected object. In step 1030 a particle (object) is detected and triggers image capture and is optionally counted in step 1035. Typically, a detected object triggers on a channel when a signal change exceeds a predetermined deviation from a threshold level. This deviation is user-settable and must be large enough that noise spikes or dust particles do not trigger detection and/or counting of false objects, but small enough to allow detection by a sensor of the smallest desired object size. When a detected object triggers on a predetermined number of data channels, an object is considered detected, and a data section is extracted from the data block for each channel. Each data section has a fixed width $t_w$ and a pre-trigger time $t_{pt}$ to insure that the full width of the object is detected. Since the object is separately triggered on each sensor, the time start is of the data section for the triggered channel is separately recorded. In certain exemplary embodiments, the beginning and end of a detected object are detected by a separate algorithm. Each algorithm scans from the beginning of the data section, looking for the time at which the signal change exceeds a predetermined threshold. To minimize the chance of a false detection, an averaging or other smoothing filter may be applied to the data. To find the end of a detected object, an algorithm performs an analysis from the end of the data section, in the reverse direction. If there may be two or more detected objects in a data section, the "end of object detection" algorithm may be changed to start looking at a peak of the signal, moving in a forward direction. In exemplary embodiments using filtered data, when the filtered data falls below the threshold the end of the object is detected.

In step 1040 velocity is calculated and if required a scaling factor is applied. One example of how velocity is calculated from the time delay is disclosed in the description of the exemplary embodiment of FIG. 2. The horizontal axis of the cross section, measured in the time domain, is converted to linear units from the standard distance equation $$X=t*V+1/2a*t^2$$

If the velocity of the object is large enough (V>>a*t for example), the equation simplifies to $$X=t*V.$$

This calibration is applied in step 1050 and is used to help calculate volume and dimensions and to prepare a two-dimensional cross section in step 1055. These two-dimensional cross sections are combined in step 1060 to calculate object volume and dimensions to prepare a three-dimensional representation in step 1065. Data is saved in step 1070.

Figure 11:
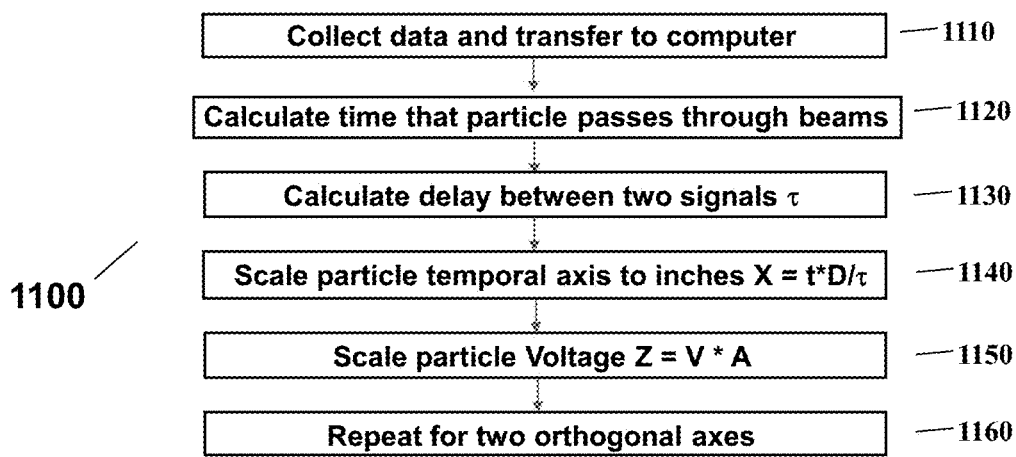
FIG. 11 illustrates an exemplary calibration procedure.

FIG. 11 illustrates an exemplary calibration procedure 1100. In the exemplary procedure shown in FIG. 11, data is collected and transferred to a computer 1110. The time it takes for an object to pass through the beams is calculated 1120. In certain exemplary embodiments, the time axis is calibrated by passing precision objects (not shown), through the sensor assembly 100. A precision object is an object of known size and volume. These objects can be as small as 0.004 inches in diameter, and can be accurately measured to within 0.0001 inches. In certain exemplary embodiments these precision objects are used to create an object profile based on the light level and/or voltage measured at the detectors. These profiles are compared to signals obtained from objects of unknown size and shape and used to estimate the size and shape of an unknown object. A delay i between two signals is calculated 1130 and the temporal delay is converted into distance (inches in this example) as a distance scale.

As an object 16 passes through the light sheets 19a/19b it creates a shadow which is detected by detectors 19a/19b, which result in a reduction in the output voltage of detectors 10 and 11, which is calibrated in step 1150. The amplitude of the voltage change VPEAK is related to the measured diameter of the object φ, and is used to calculate the calibration constant for the voltage axis k according to the equation $$k=\varphi/V_{PEAK}.$$

In certain embodiments, each detector response is calibrated independently to allow for variations in beam intensity and detector responsivity. This helps improve the accuracy of converting optical or other beam power to electrical current. As even different detectors of the same model can output a different current for a detected optical power, it is important to compensate for these differences by knowing how a detector responds to a detected signal. Detectors can be calibrated to produce a consistent output for a given signal from detector to detector by knowing how a particular detector responds. (i.e., the relationship between current and optical power can be different for different detector types) and adjusting the detector as needed to ensure it is calibrated. In certain exemplary embodiments, the constant is used to calibrate the detector voltage output axis using the equation $$Z=A*V$$

where Z is the axis relating detector voltage to a linear object dimension, and V is detector output voltage, and A is a calibration determined based on how a detector behaves (i.e., its power output for a given optical input power). These equations are used to convert a cross section signal in the voltage-time domain to a fully dimensioned cross section, as summarized in the example shown in FIG. 11. This process is repeated for two additional axes in step 1160. In the example shown the additional axes are orthogonal to each other, but they need not be. Other angular orientations can be used without departing from the scope of the present subject matter.

FIG. 12 illustrates a histogram of an exemplary object profile categorization. As shown in FIG. 12, measurements were performed of objects of different sizes and shapes, with a histogram of the measured profiles. In certain embodiments, a three-dimensional profile representation is created from three cross sections by combining the cross sections in a spherical coordinate system and interpolating the spherical radii between measured cross sections. Additional cross sections can be added to increase the accuracy of a three-dimensional representation of the object. The three-dimensional profile is an approximation of the actual object based on a mapping of cross sections, and on points between the cross sections an average value between two cross sections is of the cross sections. In still other exemplary embodiments, three-dimensional representations are created by taking a radial difference between measured points and calculating a geometric mean to estimate the radius in between points and perform a smoothing function in the non-mapped areas to create the three-dimensional representation. Inputs are taken from measurements from three or more sets of parallel beams. Interpolations can be done by any variety of smoothing algorithms known to those of skill in the art.

It will be understood that many additional changes in the details, materials, steps and arrangement of parts, which have been herein described and illustrated to explain the nature of the subject matter, may be made by those skilled in the art within the principle and scope of the invention as expressed in the appended claims.

We claim:

1. A multi-axis non-contact volume sensor for measuring a volume of an object traveling through an object aperture, the volume sensor comprising:

a first axis;
   a second axis;
   a third axis, wherein each of the first axis, the second axis, and the third axis comprises:
      a laser source configured to emit a beam,
      a parallel beam generating assembly, wherein the parallel beam generating assembly is configured to receive the beam and split the beam into a first parallel beam and a second parallel beam,
      a beam-collimating lens assembly positioned on a first side of the object aperture, wherein the beam-collimating lens assembly is configured to receive the first parallel beam and the second parallel beam and output a first beam sheet and a second beam sheet, wherein the first beam sheet and the second beam sheet are configured to traverse the object aperture,
      a first collecting lens and a second collecting lens positioned on a second side of the object aperture, and
      a first photodetector and a second photodetector, wherein the first photodetector and the second photodetector are configured to output an electrical signal proportional to the object;
   wherein the first axis, the second axis, and the third axis are arranged at an angular offset with respect to each other.

2. The multi-axis non-contact volume sensor of claim 1, wherein the angular offset is a rotational angle of 120 degrees.

3. The multi-axis non-contact volume sensor of claim 1 further comprising a data acquisition station, the data acquisition station comprising a computer and a display.

4. The multi-axis non-contact volume sensor of claim 1, wherein the first axis, the second axis, and the third axis are at an elevation angle of about 35 degrees from a horizontal plane.

5. The multi-axis non-contact volume sensor of claim 1 further comprising an additional axis.

\* \* \* \* \*